Jan. 29, 1952 G. L. TURNER 2,583,977
MEANS FOR HANDLING MATERIAL
Filed Jan. 3, 1947 6 Sheets-Sheet 1

Inventor.
George L. Turner.
By

Jan. 29, 1952 G. L. TURNER 2,583,977
MEANS FOR HANDLING MATERIAL
Filed Jan. 3, 1947 6 Sheets-Sheet 2
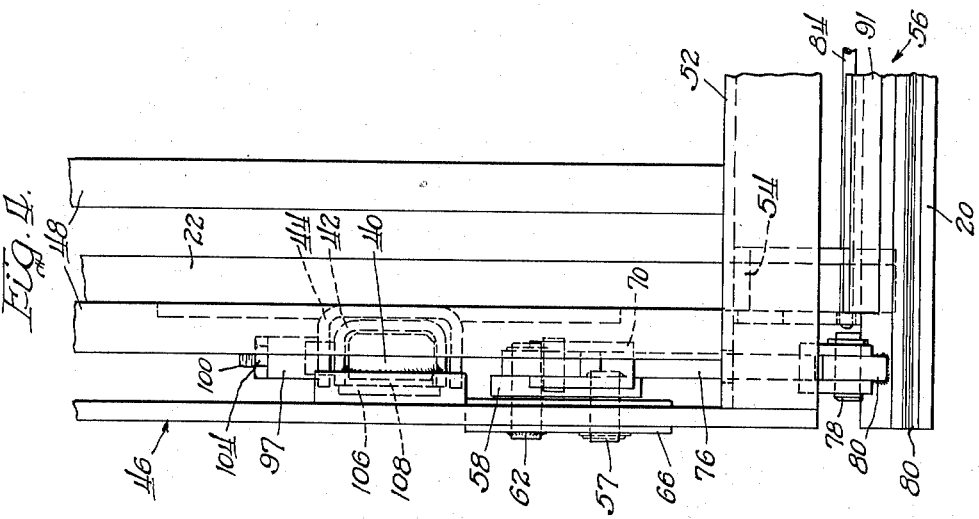
Inventor:
George L. Turner.
By Brown Jackson Bettcher Brenner
Attys.

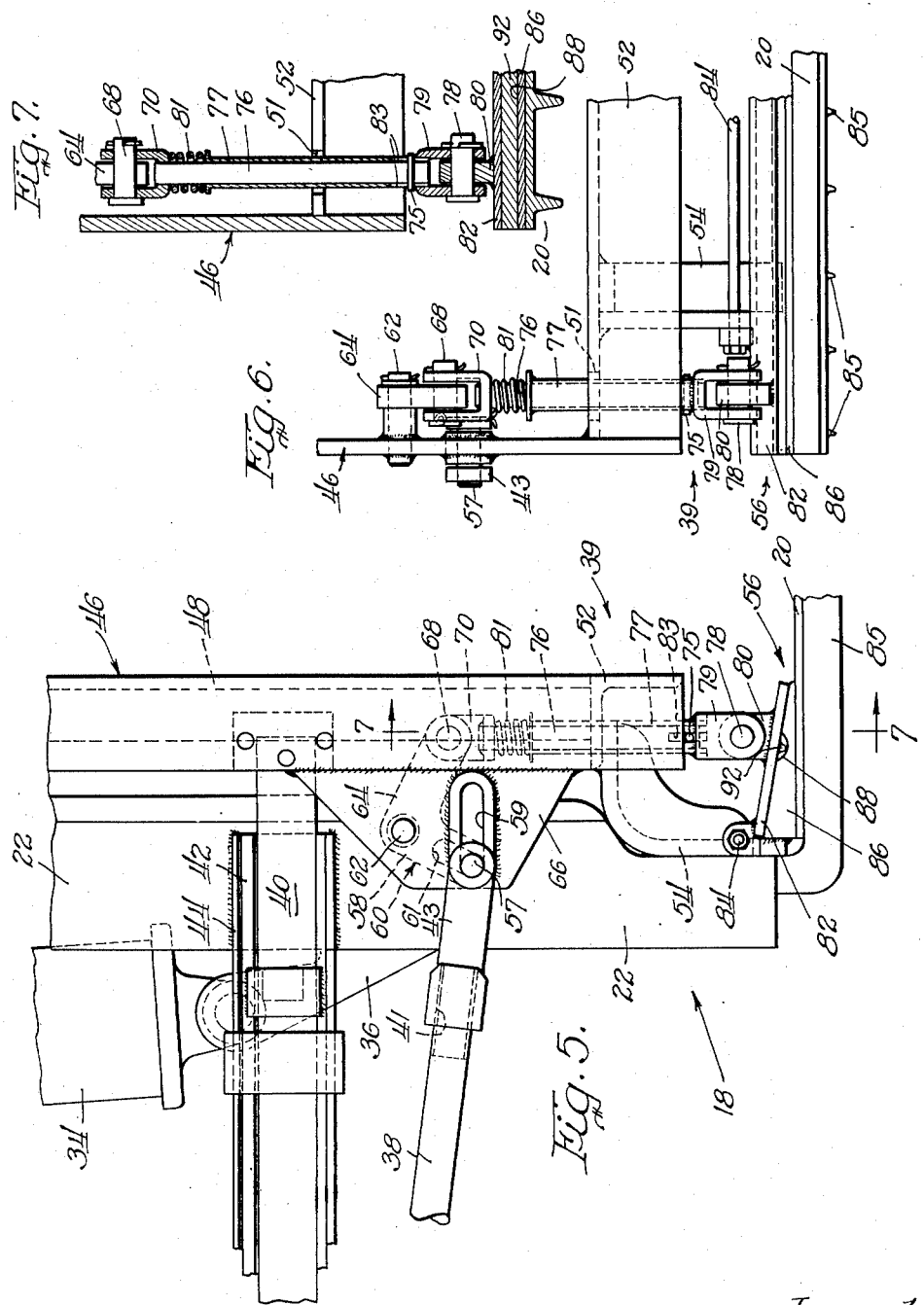

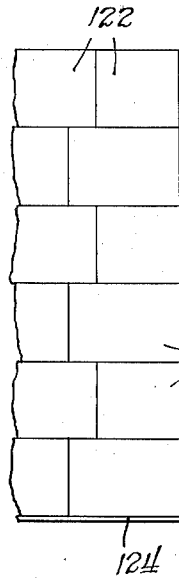
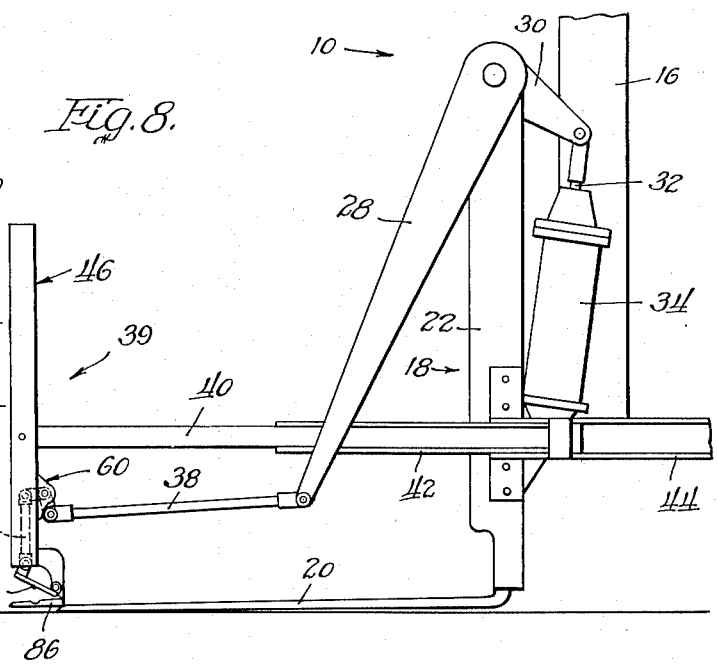
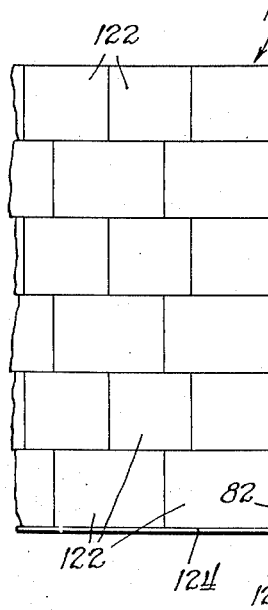
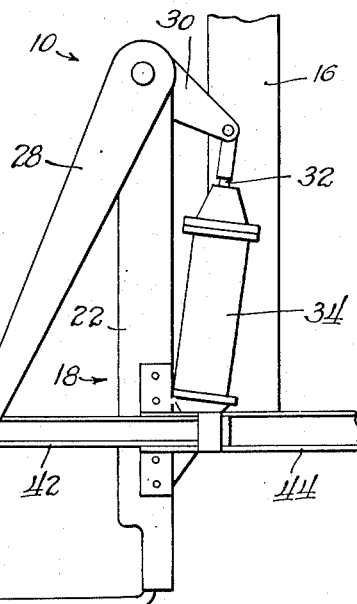

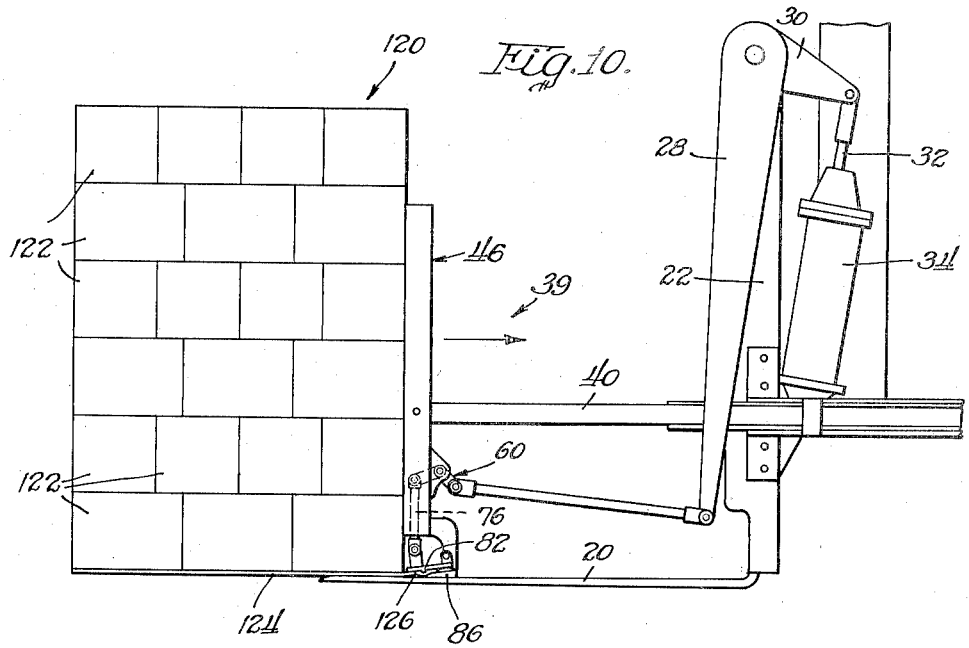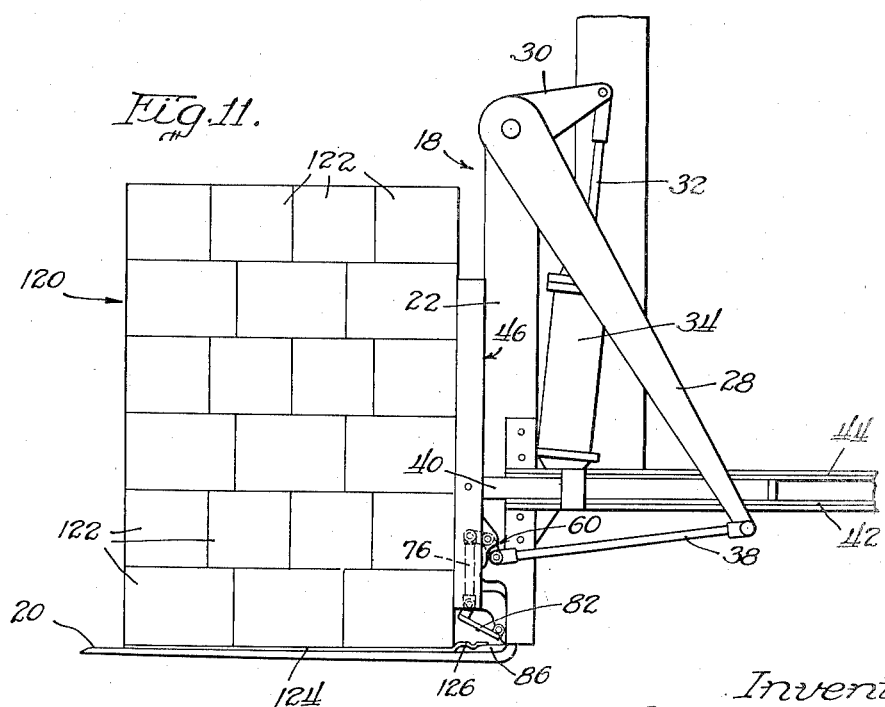

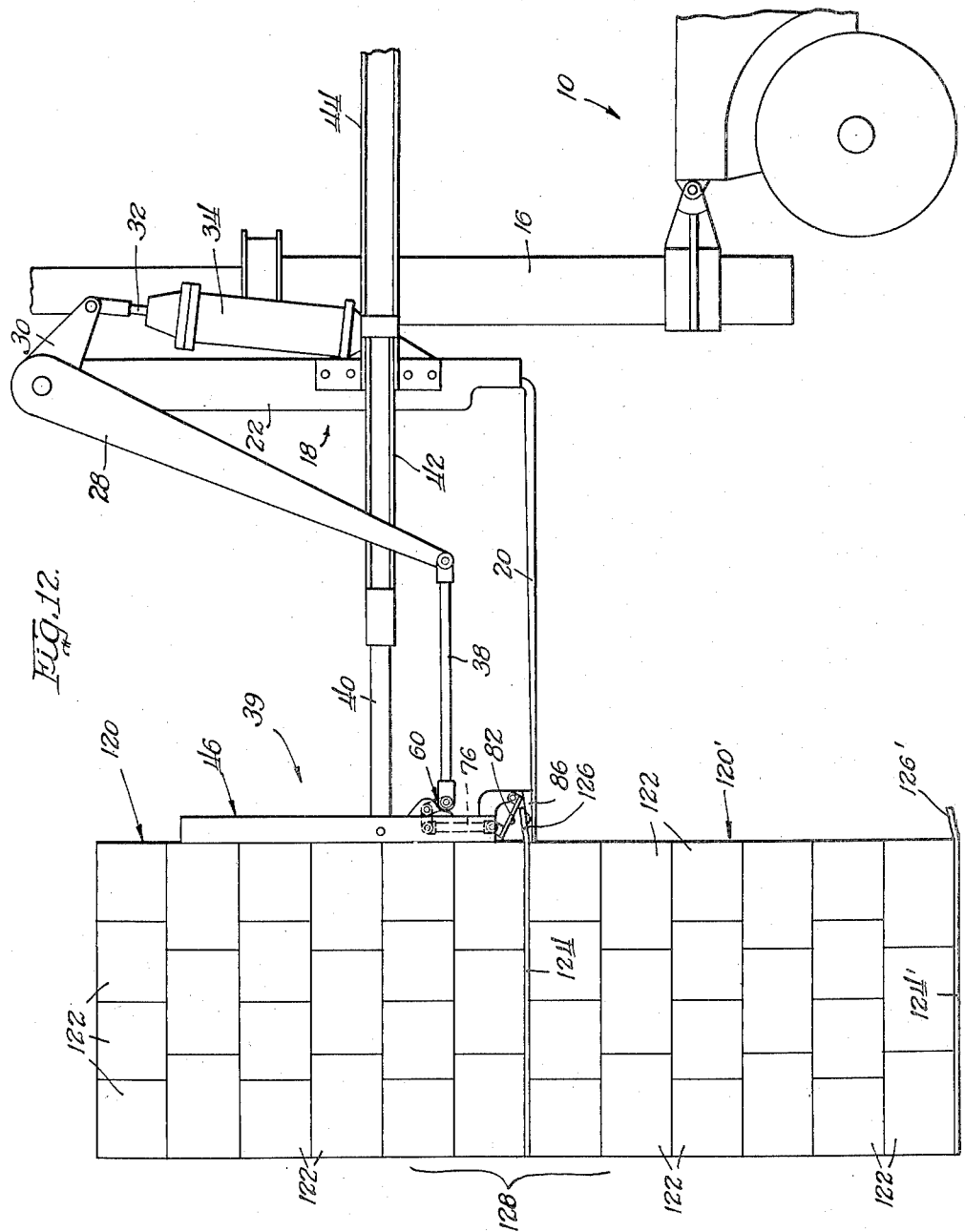

Patented Jan. 29, 1952

2,583,977

UNITED STATES PATENT OFFICE 2,583,977

MEANS FOR HANDLING MATERIAL

George L. Turner, Battle Creek, Mich., assignor to Clark Equipment Company, Buchanan, Mich., a corporation of Michigan Application January 3, 1947, Serial No. 719,969

9 Claims. (Cl. 214—113)

My invention pertains to means for handling material, particularly material which is of such shape as to permit it to be tiered for storage or shipment.

The handling of material in quantities, particularly if the material is heavy, or bulky, has required manufacturers, warehousers and shippers to employ industrial lift trucks, in order to reduce the labor required and the costs of handling the material. In my copending application, Serial No. 717,769, filed December 21, 1946, I have illustrated and described a new method of handling material, particularly material in package form, such as boxes, bags, and layers of sheet material bound together, all of which may be classified as rectangular solids and which is easily stacked. Also, disclosed in said application is a novel form of pallet employed in making up a unit load of packages. My present invention is directed to an improved form of industrial truck which may be useful in carrying out the process illustrated in said copending application. It is an advantage of my invention that the mechanism, which I shall presently describe at length, may be added to existing forms of industrial lift trucks, so that they may be employed in practicing my improved method of handling material. An additional advantage is that the mechanism is simple and compact and is inexpensive to manufacture.

It is an object of my invention to provide mechanism which will engage a load by some traction portion of the load or attachment to the load to draw it on a load supporting platen for transportation to another location. The traction portion may be a part of the load itself, which, when engaged, will draw the rest of the load with it or may consist of ears or flaps connected to the load, or may be the margin of a loaded pallet or a projecting ear of such a pallet.

It is another object of my invention to provide means which may serve to discharge a load and its pallet at a desired location and at a desired level. The mechanism proposed additionally serves as a means for picking a load off of previously stacked loads of packages without disarranging the lower loads.

Another object is to provide an improved form of clamping means which is particularly advantageous in gripping sheet-like pallets.

Other objects, uses and advantages of my invention will become apparent from the following description when taken with the accompanying drawings in which:

Figure 3 is a side elevation on enlarged scale of the load engaging means of Figure 1;

Figure 4 is a fragmentary front elevational view of the load engaging means of Figure 3;

Figure 5 is a side elevational view on enlarged scale of a modified form of load engaging means;

Figure 6 is a fragmentary front elevational view of the load engaging means of Figure 5;

Figure 7 is a sectional view on the line 7—7 of Figure 5;

Figure 8 is a fragmentary view of the industrial truck approaching a load;

Figure 9 shows the position of the industrial truck with respect to the load just prior to drawing the load on to the supporting carriage;

Figure 10 illustrates the manner in which the load is drawn on to the load bearing platen of the industrial truck;

Figure 1:
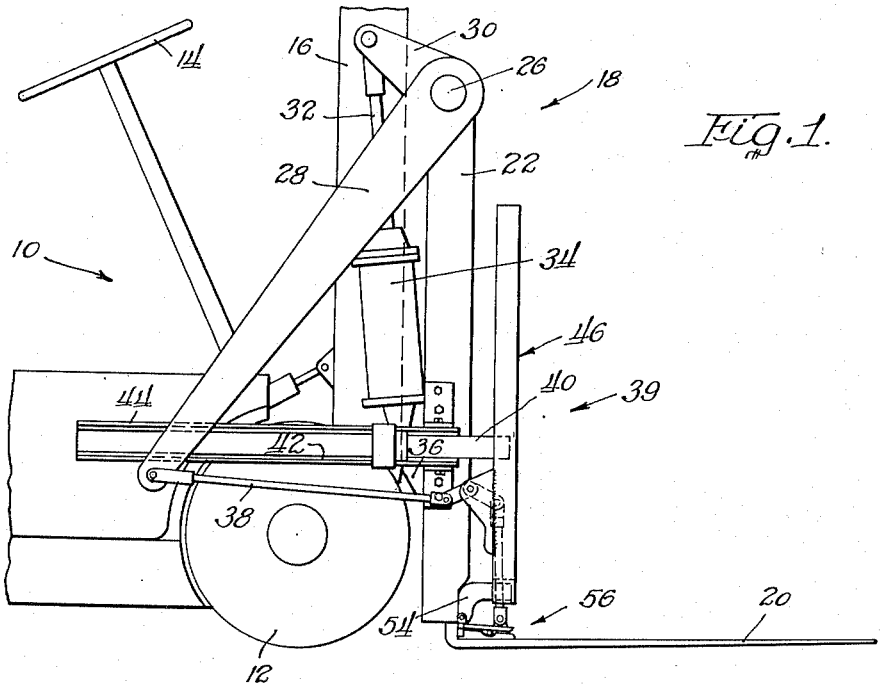
Figure 1 is a side elevational view of an industrial truck embodying the mechanism of my invention.

Figure 11 illustrates a load upon the supporting platen and carriage of the truck prior to its discharge from the platen; and Figure 12 illustrates the manner in which a load may be drawn from the top of a stack of unit loads on to the supporting platen and carriage of the truck. Like reference numerals have been employed in the several views to indicate the same or similar elements and arrows indicate the direction of movement of bodies or the direction of the application of force thereto.

To give a general, over-all view of the invention, the present machine provides a mechanism capable of performing, under the guidance and control of the operator, the desired functions of picking up, transporting and discharging a load, particularly where such load is disposed upon a sheetlike or platelike pallet, such as a sheet of paper or the like. The pallet is preferably flexible, but that is not essential. Corrugated paper cardboard, paperboard, fiber, cloth, plastic, metal or any combination of such materials suitable to resist tension, and the abrasive action of sliding of the same on supporting surfaces, may be utilized. Preferably the load on the pallet allows a margin of the pallet to project, so that it may be suitably exposed for gripping to serve as a traction member by which the pallet and its load may be pulled along the supporting surface and from one supporting surface on to another supporting surface, as in loading the machine.

The machine comprises a motor vehicle, hereinafter frequently referred to as an industrial truck provided with a mast or crane having a platform or platen carriage adapted to be raised and lowered on the crane. On said carriage there is mounted a push-pull frame guided for generally horizontal traverse over the platen or platform. The frame carries a pair of jaws for gripping the traction member of the pallet. The carriage is provided with a motor having a reciprocable power transmitting members. This may optionally involve a connecting rod for pushing and pulling the frame, and for opening and closing the jaws. Preferably only one jaw is movable, the stationary jaw being generally rigid with the frame.

The operating motion for the movable gripping jaw is secured preferably through a mechanism coupling the connecting rod with the frame through a lost motion connection. The initial motion of pulling on the connecting rod applies the gripping force upon the jaw and the reaction of the gripping force may be applied to the pusher frame in its mounting. In order to insure that the gripping force on the jaw is adequate, the resistance of the pusher frame to displacement in its carriage may be controlled by imposing a predetermined resistance to such displacement as by a suitable brake. The reverse operation of opening the jaws may be controlled in the same or like manner, so as to assure positive opening movement and positive open position of the jaw when it is desired to secure that action or that position. If desired, the bite of the jaws may be limited by springs or other yieldable means.

While I show the jaw as operable by the same motor member as that which operates the pusher frame, this is only the preferred and not necessarily the only mechanism which I may use. I contemplate employing a separate reciprocable fluid pressure motor for opening and closing the jaws under manual control, so that the two actions, i. e., gripping or ungripping of the pallet traction member and pushing or pulling on the frame are not interconnected.

Also, instead of an automatic brake on the guides to control resistance to movement, I may use a hand controlled or variable brake to vary the degree of gripping force applied.

Figure 2:
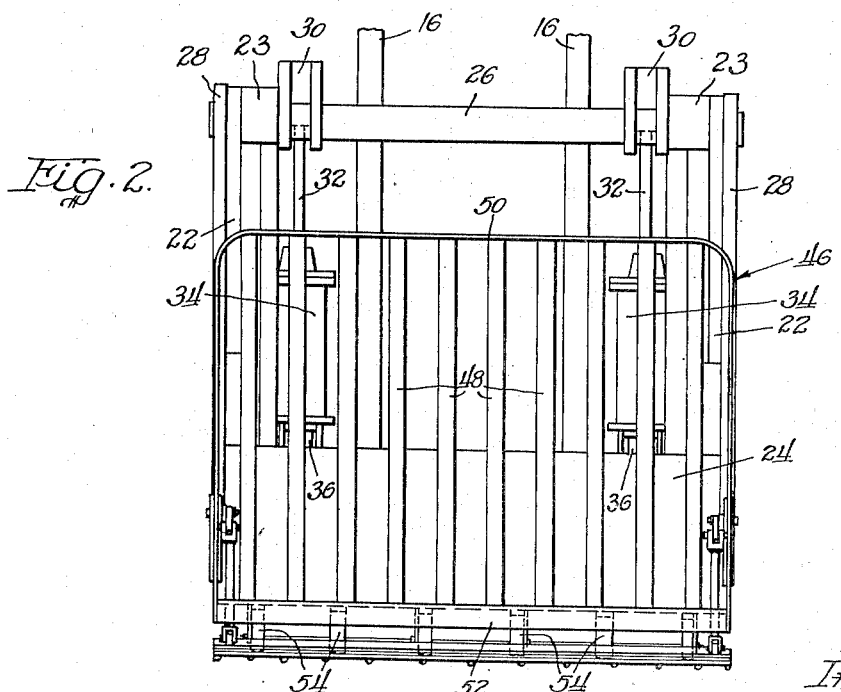
Figure 2 is a front elevational view of the truck shown in Figure 1.

Referring now in detail to the drawings, in Figures 1 and 2, there is indicated generally an industrial truck 10 having drive wheels 12 supported from the frame of the truck 10 and having steering mechanism 14 for guiding the vehicle. The uprights 16 mounted at the forward end of the truck 10 may comprise telescoping masts of a conventional design. Mounted for vertical movement in the masts 16 is a load supporting carriage indicated generally by the reference numeral 18. The carriage 18 may be raised or lowered relative to the uprights by a conventional type of hydraulic lift mechanism or in any other suitable manner. The load supporting carriage 18 is tiltable forwardly or backwardly with the uprights 16, so that the platen 20 of the load supporting carriage 18 may be inclined downwardly to bring its forward edge against the ground or other supporting surface in approaching a load or may have its front end tilted upwardly in order that the platen may clear irregularities in the ground or an incline which the truck is required to ascend, and in order to tilt a load back against the back of the carriage for more secure support of the load while travelling. Platen 20 diminishes in thickness toward its forward end and it is secured at its rear end to side frame members 22 on either side of the truck 10, said frame members being interconnected by a transverse plate 24. At their upper ends the frame members 22 carry journals 23 for receiving a cross shaft 26 which extends from one side of the load supporting carriage 18 to the other. Secured against rotation to the transverse shaft 26, outwardly of the frame members 22, are a pair of crank arms 28. Also secured against rotation to the shaft 26 but inwardly of the journal boxes 23 are a pair of short crank arms 30, thereby providing a double bellcrank lever. Pivotally connected with each crank arm 30 is a piston rod 32 which extends into a hydraulic cylinder 34. Each cylinder 34 is pivotally connected to a flange 36 extending rearwardly of the transverse plate 24 of carriage 18. Actuation of the pistons by fluid pressure applied under manually operated controls (not shown) will cause movement of crank arms 30 which are non-rotatably secured to the transverse shaft 26. The resulting rotation of shaft 26 will rotate the actuating crank arms 28 which are also non-rotatably connected with said shaft. Crank arms 28 at their lower ends are pivotally connected with rods 38.

A load engaging mechanism, indicated generally by the reference numeral 39, is supported from the side frame members 22 of load supporting carriage 18 by bars 40 which telescope within horizontally extensible channel members 42, in turn carried in the channel members 44 each of which is secured to a side frame member 22. Bars 40 may be welded, or otherwise suitably secured, to a vertically extending backing frame 46 having vertical struts 48 interconnecting the top 50 of frame 46 with a sill member 52. Supported from sill 52 by a series of L-shaped brackets 54 is a clamping device indicated generally by the numeral 56. The clamping device will be described in greater detail below. The load engaging mechanism 39 comprising the frame 46 and clamping member 56 is movable across the platen 20 of load supporting carriage 18 guided by the telescoping bars 40 and channel members 42 which are carried in channel members 44.

Rods 38 pivotally connected with the actuating crank arms 28 at their one ends are pivotally connected at their other ends by pins 57 to arms 58 of bell cranks 60 (see Figures 3 and 4). Arms 58 are non-rotatably secured to pins 62, as are arms 64, and therefore said arms, together with the pins 62, which are carried in flanges 66 on opposite sides of vertical backing frame 46, constitute bell cranks 60. The other end of each arm 64 is pivotally connected by a pin 68 between the arms of a clevis 70 which has a centrally threaded passageway 72. The threaded end 74 of connecting rod 76 is secured in the threaded passageway 72. At the lower end of rod 76 is a clevis which has a pivotal connection by means of pin 78 with a lug 80 which is welded, or otherwise secured, to the upper movable jaw 82 of the clamping device 56. The jaw 82 has a hinged connection, as at 84. Lower jaw 86 is secured to the lower end of the L-shaped brackets 54, as by welding, or other suitable means, and the pair of jaws 82 and 86 open and close by virtue of movement of jaw 82 upwardly and downwardly with respect to the fixed jaw 86. A central longitudinally extending groove 88 in the lower jaw 86 may have a rubber insert 90 bonded thereto. A cooperating wire or bead 92 longitudinally extending on the under side of jaw 82 is adapted to seat in groove 88 against the insert 90 to provide a secure grip. If desired, jaw 86 might be formed of a resilient material, such as rubber, on its upper surface. A strengthening bar 91 extends longitudinally across the top surface of jaw 82 and is welded thereto.

It will be seen that when the rods 38, connected to the actuating crank arms 28, are moved to the right, as viewed in Figure 3, the arms 58 and 64 of bell crank 60 will be moved counterclockwise and will raise the connecting rod 76 and the clamping jaw 82 connected thereto. In order to insure that the clamping jaw 82 will be raised, by movement of rod 38 to the right, before the movement of rod 38 shifts the load engaging means 39 to the right across the platen 20, friction means is provided between the telescoping members 40, 42 and 44. The friction member 37 positioned between the channel member 44 and the telescoping channel member 42 comprises a spring loaded block 96 which is in housing 97 and passes through an aperture in the channel member 44 and engages the top surface of channel member 42. The spring pressure on friction member 37 may be increased or decreased by threading screw 100 downwardly or upwardly, respectively, through housing 97, so that the washer 102 secured to the screw 100 will compress or release the spring 98 which acts against the friction member 37. A lock nut 104 secures the screw 100 in its selected position. A transverse cover plate 106 extending between and secured to the arms of channel member 42 houses a spring friction member 108, comprising a centrally deformed piece of flat spring metal, the sides of which rub against said plate 106 and the extension bar 40. Spring friction member 108 is secured against movement along with the extension bar 40 by reason of a pair of spaced apart flanges 110 which are secured to the plate 106. A grease fitting 112 secured in plate 106 permits the introduction of lubricant into the spring housing.

The spring loaded friction element 37 acting against channel member 42 and spring 108 acting between the channel 42 and the extension bar 40 serve to retain the load engaging means 39 against movement in either direction until the clamping jaw 82 has been opened or closed, depending upon the direction of movement of the load engaging means 39, by movement of the rods 38. After the clamping jaws have been separated by movement of the rod 38 to the right, under the control of the operator of the lift truck, continued movement of rods 38 will then overcome the friction of the friction members acting on the telescoping bars 40 and channel members 42. Consequently, the load engaging means, including the clamping device 56, will be moved to the right across the platen 20. Then, when the rod 38 is moved to the left, as viewed in Figure 3, it will first crank the arms of bell crank 60 in a clockwise direction and thereby cause a downward movement of the clamping jaw 82. The lost motion connection permits this. When the jaws 82 and 86 are closed, continued movement of the rod 38 to the left will overcome the friction between the extension bar 40 and channel members 42 and 44 and will draw the load engaging mechanism 39 and its clamping device 56 towards the left, or backwardly across the load supporting platen 20. This latter movement is employed for drawing a load onto the platen 20 while the forward movement, that is, to the right, as viewed in Figure 3, is employed for discharging a load from the platen 20.

Referring now to Figures 5, 6 and 7, a clamping member 56 having modified actuating mechanism connected between it and the rods 38 will be described. Where the elements of this mechanism are the same as those illustrated in Figures 1 to 4, the same reference numerals will be employed, and where there are pairs of similar elements on opposite sides of the truck, only the elements on one side will be described. Each of the rods 38 has its end threaded into a socket 41 of a stub shaft 43 which carries a pin 57 at its other end. Pin 57 is adapted to move within a slot 59 in the flange 66 which is secured to the rear side of the frame member 46. This provides a lost motion connection to permit the jaw to be first actuated before the carriage moves. A pin 62 secured to flange 66 serves as a pivot point for the bell crank 60 which has arms 58 and 64. Pin 57 on the stub shaft 43 engages not only slot 59 in the flange 66, but also a slot 61 in the arm 58 of bell crank 60. The end of arm 64 of bell crank 60 is pivotally connected with a clevis 70 by a pin 68, the clevis 70 being connected to a connecting rod 76 which carries a pin 75 at its lower end. A sleeve 77 surrounds the connecting rod 76 and is secured, as by welding, at its lower end to a clevis 79. The clevis 79 is, in turn, connected by pin 78 with the lug 80 which is welded to the upper clamping jaw 82 of the clamping device 56. Positioned between the clevis 70 and the flanged end of sleeve 77 is a compression spring 81 which serves to press the sleeve 77 downwardly along the connecting rod 76, the sleeve being guided by a slot 83 which fits over the pin 75 of rod 76. It will be noted from Figure 7 that the connecting rod 76 and the sleeve 77 pass through an aperture 51 in the sill 52 of backing frame 46. Jaw member 82 has a hinged connection, as at 84, with the L-shaped brackets 54 and is adapted to move toward and away from a lower jaw 86, depending upon the direction of movement of the rod 38. Jaw member 86 is secured as by welding to the L-shaped brackets 54. Jaw 86 has a longitudinally extending groove 88 in which a wire or bead 92 on the movable jaw member 82 is adapted to seat. The platen 20 of the load supporting carriage 18 is secured to the side frame members 22 by a plurality of supporting ribs 85.

When rod 38 is moved from its position, as shown in Figure 5, towards the right, the pin 57 is guided along in slot 59 of the flange 66 and simultaneously moves the bell crank 60 in a counter-clockwise direction as the pin moves along in slot 61 of arm 58 of said bell crank. Arm 64 of bell crank 60 therefore pulls upwardly on the connecting rod 76 and pin 75 at the lower end of said rod strikes against the upper end of slot 83 and thereby draws the sleeve 77 upwardly with it. Since sleeve 77 is connected to the clevis 79 and thereby to the jaw 82, the movement of rod 38 to the right will separate the jaws 82 and 86. Continued movement of rod 38 to the right will cause the pin 57 of shaft 43 to strike the end of slot 59, at which time the clamping device 56 is opened and the load engaging means 39 is pushed to the right across the platen 20. When it is desired to draw the load engaging means 39, including the clamping device 56, backwardly across the platen 20, that is, towards the left, as viewed in Figure 6, the rod 38 is drawn to the left and serves first to slide along the slot 59 of the flange 66 while simultaneously cranking the bell crank 60 in a clockwise direction to close jaw member 82 downwardly against the jaw 86. It will be seen that arm 64 of the bell crank 60 presses the clevis 70 against the compression spring 81 which spring, in turn, presses against the flanged end of the sleeve 77 and thereby against the clamping jaw 82. The connecting rod 76, in the meantime, moves downwardly within the sleeve 77, but its pin 75 does not strike against the clevis. Consequently, the jaw 82 is spring loaded against the jaw 86 and the spring 81 therefore serves as a pressure limiting device in actuating the jaws.

As previously pointed out above, the foregoing mechanism is well adapted to carry out the method of handling material described in my copending application, Serial No. 717,769, filed December 21, 1946. I shall now describe the manner in which this mechanism is employed and for purposes of description shall illustrate the device shown in Figures 1 to 4. It will be appreciated, however, that the modified structure shown in Figures 5, 6 and 7 will serve the same purpose.

Reference should now be made to Figures 8 through 11. A load 120 of packages 122, which are indicated as rectangular solids, are stacked together to provide a unit load of generally rectangular shape. The load 120 of stacked packages is shown resting upon a sheetlike pallet 124 which is preferably of slightly smaller cross-sectional area than the cross-sectional area of the load 120, but which has an extending flap or ear 126. The flap 126 may comprise the margin of the sheetlike pallet 124, which margin is bent upwardly either during its manufacture or by operation of the clamping device 56 of the industrial truck 10, as explained hereinafter. The illustrated pallet 124 is formed of corrugated paperboard, but may be formed of other material and with modified forms of margins or projecting ears, such as those illustrated in my copending application, Serial No. 717,769, filed December 21, 1946. The unit load of packages 120 and the pallet 124 are shown resting on a floor and the industrial truck 10 is shown as approaching the load 120 and the projecting margin 126 of the pallet 124. It will be appreciated that the packages 120 might be secured together by straps or ropes, or by the application of adhesives between the surfaces of the various boxes and that in such secured together condition a projecting flap, ear, or other traction member might be secured to the load 122 without the use of a pallet. The approaching load engaging mechanism 39 has the clamping jaw 82 open by reason of the fact that the operator of the truck has caused the actuation of piston 32 of hydraulic cylinder 34 downwardly and has therefore caused clockwise rotation of the crank arms 30 and 28. Such movement of the actuating crank arms 28 has caused the rods 38 to move to the left, as viewed in Figure 8, and has resulted in the cranking of bell cranks 60 in a clockwise direction to thereby raise jaw 82 by reason of the connecting rods 76.

Since the backing frame 46 has its front face slightly in advance of, or flush with, the front edges of the jaws 82 and 86, said frame 46 will engage the side of the load 120 while the lower jaw 86 of the clamping device 56 slides under the extending flap 126 of the pallet 124. At this time, flap 126 is positioned between the jaws 82 and 86 and the operator will, therefore, reverse the action of the hydraulic or other controls to cause piston 32 to move upwardly from the cylinder 34 and to thereby rotate the crank arms 30 and 28 in a counter-clockwise direction to thereby retract each of the rods 38 with the view to drawings the load 120 on to the platen 20 of the load supporting carriage 18. The movement of each rod 38 to the right, as viewed in Figure 9, will cause its bell crank 60 to rotate in a counter-clockwise direction whereby connecting rod 76 will be urged downwardly to thereby press the upper clamping jaw 82 down tightly against the flap 126 of pallet 124 and to grip it between jaw 82 and the lower jaw 86. After the jaws are closed, further movement of rod 38 to the right serves to draw the whole load engaging mechanism 39 on to the platen 20, since the clamping device 56 grips the margin 126 of the pallet 124. The vertically extending backing frame 46 steadies the unit load 120 as it is being drawn along on the pallet 124.

Referring now to Figure 10, the load 120 will be seen drawn partially on to the platen 20 and the telescoping channel member 42 will be seen as partially telescoped within the supporting channel member 44. Ultimately, the channel member 42 and rod 40 will be completely telescoped within the channel member 44, as may be seen in Figure 11. Figure 11 shows the unit load of packages 120 fully positioned upon the platen 20 and in position to be transported by the industrial truck 10 to any location desired. Normally, the load supporting carriage 18 and a platen 20 will be suitably elevated above the floor before the industrial truck is moved from the position in which it was loaded. In Figure 11 the clamping device 56 is shown in its open position. Normally, during transfer of the load by the truck 10 to its destination, the clamping device 56 will be closed. Figure 11, therefore, may also represent the first step in the discharge of load 120 from the platen 20. In such first step the operator actuates the controls to cause the piston rod 32 to move downwardly into piston 34 and thereby to rotate the crank arms 30 and 28 clockwise. Such rotation of arms 30 and 28 actuates rod 38 and moves it toward the left, as viewed in Figure 11. As described earlier, such movement will cause the bell crank 60 to move in a clockwise direction and will thereby raise the connecting rod 76 and the clamping jaw 82 connected therewith. Subsequent movement of the piston 32 in a downward direction will cause rod 38 to move still farther to the left and the vertical backing frame 46 will then serve as a pushing mechanism, guided by the telescoping members 40, 42 and 44, to push the load, together with its pallet 124, to the left and off of the edge of the platen 20. Although pushing of the load 120 from off the edge of the platen 20 would discharge said load from the truck 10, it is a crude method of unloading and the normal operation will consist of positioning the platen 20 directly over the receiving area and then simultaneously withdrawing platen 20 from beneath the load 120 and pallet 124 while the load engaging mechanism 39 moves forwardly across the platen. This operation will cause the pallet and load to gravitate directly onto the receiving area, whether it be a floor, platform, or the top of another load of packages. It will be seen that the frame 46, together with the clamping device 56, serves to push the load 120 across the platen 20. However, having merely the frame 46 pushing against the load will cause the load to draw the pallet with it, since the co-efficient of friction between the load and the upper surface of the pallet is considerably greater than the coefficient of friction between the lower side of the pallet and the smooth surface of the platen.

Assuming now that the operator of the truck 10 desires to untier a unit load 120 from a stack of unit loads, represented in Figure 12 by the reference numeral 126, the truck 10 will be brought up to the front of the stack 126 and the platen 20 will be elevated to a position slightly below the extending margin or flap 126 of the pallet 124 on which the desired load 120 rests. This action serves first to steady the load 120' which rests beneath the desired load 120, and also positions the platen 20, so that the load 120 may be easily drawn on to said platen without disturbing its individual packages 122. The platen 20 having been so located, the operator of the truck 10 causes the pistons 32 to be actuated by cylinders 34 in such a fashion that the pistons are drawn into the cylinders and thereby rotate the crank arms 30 and 28 in a clockwise direction. This action causes rods 38 initially to open the clamping jaws 82 and 86, and then to press the load engaging mechanism 39 to the left, as viewed in Figure 12, until it comes against the side of the desired load 120. With the vertically extending frame 46 steadying the load and with the margin 126 of pallet 124 positioned between the clamping jaws 82 and 86, the operator will then manipulate the hydraulic controls to cause the cylinders 34 to move the piston rods 32 upwardly from said pistons and thereby to cause the crank arms 30 and 28 to rotate in a counter-clockwise direction. This will cause rods 38 to be drawn to the right, as viewed in Figure 12, and to thereby actuate the bell cranks 60 in a counter-clockwise direction and cause the connecting rods 76 to press the movable jaw 82 against the margin 126 and into engagement with the jaw 86. Continued movement of rods 38 to the right will then retract the load engaging mechanism 39 and the loaded pallet 124 will then be pulled by the clamping device 56 from off the top of the stack 126 on to the platen 20 of load supporting carriage 18. The load engaging mechanism 39 is guided backwardly by the telescoping members 40, 42 and 44 and, when they are fully retracted, the load 120 will be completely positioned upon the platen 20 with the pallet 124 beneath the load. The truck 10 may then transport load 120 in its elevated position, or may lower the load supporting carriage 18 which is carried on the uprights 16 at the forward end of truck 10. The load 120 may be deposited upon a desired receiving area by first aligning the platen 20 vertically with said area and by then withdrawing the platen 20 from beneath the load while pushing the load and pallet off of the platen, so as to permit the load and pallet to gravitate on to the receiving area, in the manner described above.

When the pallet 124 does not have a margin or ear upwardly turned during its manufacture, such bending may take place when the pallet and a load is initially picked up by the industrial truck. This bending occurs as the lower jaw 86 slides along the surface on which the pallet rests and moves under the extending margin of the pallet. After such a margin has once been bent upwardly and gripped, it continues in such upwardly turned fashion, so that it is readily gripped thereafter by the clamping device 56 of the load engaging mechanism 39.

In the modified load engaging mechanism illustrated in Figures 5, 6 and 7, the traction portion of the load, which normally comprises the extending flap or margin 126 of the pallet 124, is gripped in the same fashion, except that the pressure of the jaws 82 and 86 is controlled by the loading of the spring 81, instead of by direct pressure of non-resilient connecting elements.

Because of the compactness and simplicity of the load engaging means and its actuating mechanism, existing forms of lifting trucks may be readily equipped with my invention at little cost. Also, if desired, the platen 20 may be made a detachable, so that it will be removable from the lift fork of standard lift trucks when it is desired to use such lift forks for their present type of operation. It will be seen that various changes and modifications may be made in the structure illustrated and described above without departing from the scope of the invention, as defined by the following claims.

I claim:

1. In combination, a horizontally disposed load supporting member, means for transporting the load supporting member, load engaging means including a clamping device disposed horizontally above said supporting member and actuating means for operating the clamping device and for moving the load engaging means horizontally across the supporting member, said actuating means having a lost motion connection with the load engaging means and having a positive connection with said clamping device whereby movement of the actuating member in one direction serves first to open the clamping device and then to move the load engaging means and movement of the actuating member in the opposite direction is adapted first to close said clamping device and then to move the load engaging means in said opposite direction.

2. The combination of claim 1 wherein the clamping device is closed by a compression spring in series in the connection between the clamping member and the actuating means.

3. In combination, a horizontally disposed load supporting member, means for transporting the load supporting member, load engaging means including a clamping device disposed laterally across said supporting member, said clamping device comprising a pair of gripping jaws one of which has a resilient gripping surface, and means for moving the load engaging means horizontally across the supporting member and for operating its clamping device.

4. The combination of claim 3 wherein the gripping jaws have interdenting members and movement of the actuating means first actuates the jaws and then moves the load engaging means across the supporting member.

5. In combination, a supporting carriage having a horizontally disposed load supporting platen, means for transporting and elevating said carriage and its platen, a load engaging mechanism supported by said carriage and including means for engaging a traction portion of a load to draw it onto the supporting platen and a backing portion adapted to steady a load and to discharge it from the supporting platen when the load engaging means is moved forwardly relative to the platen, actuating mechanism for moving the load engaging means across the platen, said actuating mechanism having a lost motion connection with the load engaging means and having a direct connection with cranking means carried by the load engaging mechanism for operating said engaging means.

6. The combination of claim 5 wherein the means for engaging a traction portion of a load comprises spaced apart jaws one of which is operated by said cranking means.

7. In combination, a supporting carriage having a horizontally disposed load supporting platen, means for transporting and vertically moving said carriage, load engaging means, actuating mechanism for moving the load engaging means forwardly and backwardly relative to the load supporting platen, said load engaging means including a clamping device disposed horizontally above the supporting member and a backing portion extending vertically above the clamping device, said actuating mechanism having a connection with the clamping device for operating the same by means of a bell crank pivoted on the backing portion of the load engaging means whereby movement of the actuating mechanism first operates the clamping device to its open or closed position, depending on the direction of movement of the actuating mechanism, and then exerts force against the load engaging means to move it across the load supporting platen.

8. The combination of claim 7 wherein the load engaging means is movable on telescoping arms supported from the carriage and friction means acting on said telescoping arms restrains the movement of the load engaging means until the actuating mechanism first operates the clamping device to its open or closed position.

9. In a machine of the class described, a platen carriage mounted for up and down motion, a traversing frame slidably mounted on the carriage for traversing the platen substantially horizontally, a motor having a rod for pushing or pulling the frame on said mounting relative to the carriage, a stationary jaw carried by said frame, a movable jaw movably mounted on said frame, said rod having a lost motion connection relative to the frame and a direct connection to said jaw, said direct connection to the jaw having a pivot on the frame for transmitting the reaction of the jaw closing force to the frame tending to move it relative to the carriage, and a brake to provide limited resistance to movement of the frame relative to the carriage.

GEORGE L. TURNER.

REFERENCES CITED

The following references are of record in the file of this patent:

UNITED STATES PATENTS

| Number | Name | Date |
|---|---|---|
| 1,451,879 | Lacke | Apr. 17, 1923 |
| 1,587,855 | Redding | June 8, 1926 |
| 1,640,691 | Clark | Aug. 30, 1927 |
| 1,826,489 | Abbe | Oct. 6, 1931 |
| 1,896,543 | Gfrorer | Feb. 7, 1933 |
| 1,924,885 | Schreck | Aug. 29, 1933 |
| 2,122,992 | Pride | July 5, 1938 |
| 2,256,454 | Bomar | Sept. 16, 1941 |
| 2,328,397 | Neuman | Aug. 31, 1943 |
| 2,412,155 | Jessen | Dec. 3, 1946 |
| 2,418,661 | Palm | Apr. 8, 1947 |

FOREIGN PATENTS

| Number | Country | Date |
|---|---|---|
| 762,341 | France | Oct. 13, 1933 |